United States Patent [19]
Atwell et al.

[11] 3,878,234
[45] Apr. 15, 1975

[54] PREPARATION OF HYDROCARBON SILANES FROM POLYSILANES
[75] Inventors: William H. Atwell; Gary N. Bokerman, both of Midland, Mich.
[73] Assignee: Dow Corning Corporation, Midland, Mich.
[22] Filed: July 30, 1973
[21] Appl. No.: 383,758

[52] U.S. Cl. ............... 260/448.2 E; 260/448.2 D; 260/448.2 P; 260/448.8 R
[51] Int. Cl. ........................... C07f 7/08; C07f 7/12
[58] Field of Search... 260/448.2 E, 448.2 P, 448.2 D, 260/448.8 R

[56] References Cited
UNITED STATES PATENTS
3,346,349   10/1967   Harding et al. ............. 260/448.2 E OTHER PUBLICATIONS
Banford et al., "Inorg. Nacl. Chem. Letters," 8(8), pp. 733–736, (1972), Pergamon Press.

Primary Examiner—Paul F. Shaver
Attorney, Agent, or Firm—Robert F. Fleming, Jr.

[57] ABSTRACT

Polipilanes having methyl and/or chlorine attached to the silicon atom are reacted with hydrocarbon halides in the presence of tertiary amines or their halide salts or quaternary ammonium or quaternary phosphonium halides to give hydrocarbon chloro monosilanes. For example, allyl chloride is reacted with hexachlorodisilane in the presence of tetrabutyl phosphonium chloride to give allyl trichlorosilane.

6 Claims, No Drawings

PREPARATION OF HYDROCARBON SILANES FROM POLYSILANES

It is known from U.S. Pat. No. 2,474,087 that hydrocarbon halides can be reacted with hexachlorodisilane without a catalyst to produce hydrocarbon halosilanes. The patent also teaches that, if desired, cuprous chloride, antimony trichloride, or mercuric chloride can be employed as catalysts. However, all the examples in the patent show reaction temperatures ranging from 200° to 350°C.

It is also known from U.S. Pat. No. 2,709,176 that one can react polysilanes with hydrogen chloride in the presence of tertiary amines or their halide salts to give silanes having higher SiH content than the starting material. However, this reaction does not establish any new silicon-carbon bonds but merely establishes silicon-hydrogen and silicon-chlorine bonds.

It is also known from U.S. Pat. Nos. 2,598,435 and 2,842,580 that rearrangement of methyl and chlorine substituted polysilanes can be carried out to produce monomeric silanes and polysilanes having a greater number of silicon atoms than the starting polysilane. This is particularly taught in column 3, line 20, of U.S. Pat. No. 2,842,580. The former of these two patents teaches this rearrangement in the absence of a catalyst and the latter teaches that it can be carried out in the presence of quaternary ammonium halides, or quaternary phosphonium halides. However, in this reaction one builds up a residue of polysilanes which in themselves are of no commercial utility. Also no new carbon-silicon bonds* are formed in this reaction and there is no suggestion that the quaternary ammonium halides or phosphonium halides would be catalysts for the reaction of hydrocarbon halides with polysilanes.

*Except by rearrangement.

It is the object of this invention to carry out the reaction of hydrocarbon halides with polysilanes in a manner which is more economically feasible than that shown in U.S. Pat. No. 2,474,087; namely at a lower temperature and in better yields. It is also the object of this invention to be able to utilize polysilane residues which occur from the reaction of methyl chloride with silicon and from the reaction of hydrogen chloride with silicon to produce more commercially valuable materials. It is a further object to carry out this reaction without producing silicon hydrides which although usable, are often not desirable. Finally it is an object of this invention to carry out the aforesaid reaction with the production primarily of hydrocarbon substituted monosilanes and silicon tetrachloride both of which are commercially usable materials.

This invention relates to a method of reacting (1) RCl with (2) $Me_xCl_ySi$ to produce $RMe_xSiCl_{3-x}$, the improvement comprising carrying out the reaction in contact with a catalytic amount of a catalyst of the group consisting of $R'_3N$, $R'_3N.HCl$, $R'_4NCl$ and $R'_4PCl$ at a temperature from 30° to 250°C. in which R is an alkyl radical of from 1 to 18 carbon atoms, an alkenyl radical of from 2 to 18 carbon atoms, or an aralkyl radical of from 7 to 18 carbon atoms, $x$ is 0 to 2, $y$ is 1 to 3, the sum of x and y being from 1.5 to 3, all the silicon atoms in (2) being bonded to at least one other silicon atom and all the valences of the silicon atoms in (2) being satisfied by other silicon atoms, Cl or Me radicals, and R' is an alkyl or aralkyl radical of from 1 to 18 carbon atoms.

The process of this invention is carried out by reacting (1) and (2) in the presence of the catalyst at a temperature of from 30° to 250°C. The optimum temperature varies with the catalyst employed and with the reactivity of the hydrocarbon halide and the polysilane. The reaction can be carried out at atmospheric pressure or at superatmospheric pressure and it can be carried out in the presence or absence of a solvent. Thus, the amount of solvent employed, if desired, is not critical and the primary purpose of the solvent is to facilitate handling of the reaction mixture. If employed, the solvents are those which do not react with chlorosilanes and can be any such solvent such as hydrocarbons, such as benzene, toluene, pentane, and the like, or any halohydrocarbon such as chlorobenzene, or chlorotoluene; ethers such as dibutyl ether, or the dimethyl ether of ethylene glycol; or nitriles such as acetonitrile.

The polysilanes employed in this invention can be prepared by any conventional means known in the art. For one they are by-produced in the commercial reaction of methyl chloride with silicon to form methylchlorosilanes. In this process, most of the polysilanes employed have some methyl groups substituted on the silicon atoms. Hexachlorodisilane and polysilanes containing only chlorine are by-produced in the commercial process of reacting hydrogen chloride with silicon to produce trichlorosilane. For the purpose of this invention, one can first isolate individual species of the silanes and then react them in the process of this invention or one can merely use the residue from the aforesaid commercial processes.

Operative examples of silanes are disilanes such as hexachlorodisilane, 1,2-dimethyltetrachlorodisilane, 1,1-dimethyltetrachlorodisilane, 1,1,2,2-tetramethyldichlorodisilane; polymeric silanes having more than two silicon atoms such as

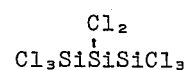

or branched complicated structures having the empirical formula $Cl_{1.5}Si$, $Cl_2Si$, or $Me_2Cl_{1.8}Si$. Thus, (2) can vary from dimeric materials to high polymeric materials.

The basic reaction involved is the cleavage of the silicon-silicon bond to establish a silicon-carbon bond and a new silicon-chlorine bond. Although the exact mechanism for this reaction is not clearly understood and is undoubtedly quite complicated, the overall effect is the above reaction. Thus, the products of this invention are monomeric materials of the formula $RMe_xSiCl_{3-x}$ and silicon tetrachloride.

The hydrocarbon halides employed in this invention can be those in which R is any alkyl radical of from 1 to 18 carbon atoms such as methyl, ethyl, isopropyl, t-butyl, octyl, or octadecyl, or any alkenyl radical of 2 to 18 carbon atoms, such as allyl, methallyl, hexenyl, octenyl, or octadecenyl, and any aralkyl radical of 7 to 18 carbon atoms, such as benzyl, beta-phenylethyl, beta-phenylpropyl, omega-phenyldodecyl, beta-naphthylethyl, gamma-xenylpropyl, tolylmethyl, and p-vinylbenzyl.

As can be seen, the catalysts employed in this invention are tertiary amines, their chloride salts, quaternary ammonium chlorides and quaternary phosphonium chlorides. Any of these materials can be employed in this invention in which R' is any alkyl radical of from mol of disilane. The mixture was then heated as indicated in a closed container and the progress of the reaction was followed by g.l.c. The solvent used in Runs 1 to 6 and 9 to 11 was benzene and that used in Runs 7, 8 and 12 to 15 was o-dichlorobenzene.

| Run No. | Silane | Weight in g. | Organic Halide | Weight in g. | Catalyst | Weight in g. | Temperature °C. | Time | Yield* | Product |
|---|---|---|---|---|---|---|---|---|---|---|
| 1 | $Si_2Cl_6$ | 10.8 | $C_3H_5Cl$ | 3.27 | $NPr_3$ | 0.284 | 75 | 96 hr. | 70% | $C_3H_5SiCl_3$ |
| 2 | $Si_2Cl_6$ | 5.9 | $C_3H_5Cl$ | 1.7 | $NBu_3$ | 0.224 | 75 | 118 hr. | 80% | $C_3H_5SiCl_3$ |
| 3 | $Si_2Cl_6$ | 10.8 | $C_3H_5Cl$ | 3.06 | $HNBu_3Cl$ | 0.439 | 75 | 115 hr. | 81% | $C_3H_5SiCl_3$ |
| 4 | $Si_2Cl_6$ | 4.60 | $C_3H_5Cl$ | 1.31 | $Bu_4NCl$ | 0.238 | 75 | 12 hr. | 80% | $C_3H_5SiCl_3$ |
| 5 | $Si_2Cl_6$ | 5.39 | $C_3H_5Cl$ | 1.53 | $Bu_4PCl$ | 0.30 | 75 | 24 hr. | 77% | $C_3H_5SiCl_3$ |
| 6 | $Si_2Cl_6$ | 5.9 | $C_3H_5Cl$ | 1.7 | None | — | 75 | 115 hr. | trace | $C_3H_5SiCl_3$ |
| 7 | $Si_2Cl_6$ | 10.8 | $C_4H_9Cl$ | 3.70 | $Bu_4NCl$ | 0.566 | 100 | 140 hr. | 46% | $C_4H_9SiCl_3$ |
| 8 | $Si_2Cl_6$ | 10.8 | $C_4H_9Cl$ | 3.7 | None | — | 125 | 26 hr. | None | — |
| 9 | $Si_2Cl_6$ | 23.8 | $PhCH_2Cl$ | 11.3 | $Bu_4PCl$ | 1.31 | 75 | 22 hr. | 87% | $PhCH_2SiCl_3$ |
| 10 | $Si_2Cl_6$ | 23.8 | $PhCH_2Cl$ | 11.3 | None | — | 75 | 24 hr. | None | — |
| 11 | $Si_2Cl_6$ | 4.48 | MeCl | 55 psi | $Bu_4PCl$ | 0.83 | 100 | 46 hr. | 86% | $MeSiCl_3$ |
| 12 | $Me_2Si_2Cl_4$ | 4.42 | $C_3H_5Cl$ | 1.48 | $Bu_4NCl$ | 0.280 | 125 | 30 hr. | 70% | $C_3H_5MeSiCl_2$ |
| 13 | $Me_2Si_2Cl_4$ | 4.42 | $C_3H_5Cl$ | 1.48 | None | — | 125 | 77 hr. | None | — |
| 14 | $Me_3Si_2Cl_3$ | 3.16 | $C_3H_5Cl$ | 1.17 | $Bu_4PCl$ | 0.226 | 125 | 114 hr. | 27% | $C_3H_5MeSiCl_2$ |
| 15 | $Me_3Si_2Cl_3$ | 3.16 | $C_3H_5Cl$ | 1.17 | None | — | 125 | 200 hr. | trace | $C_3H_5MeSiCl_2$ |

*Mol % based on mols of starting silane.

1 to 18 carbon atoms, such as methyl, ethyl, butyl, propyl, isopropyl, t-butyl, octyl, dodecyl, or octadecyl, and any aralkyl radical of from 7 to 18 carbon atoms such as benzyl, beta-phenylpropyl, beta-phenylethyl, tolylmethyl, xenylethyl, beta-naphthylethyl, or omega-phenylhexyl.

The amount of catalyst employed in this invention is not critical as long as there is a catalytic amount present. A "catalytic amount" is that amount required to substantially enhance the rate of the reaction over that obtained with no catalyst present. The preferred range is from 0.01 to 10 percent by weight based on the total weight of reactants (1) and (2).

The following examples are illustrative only and should not be construed as limiting the invention which is properly delineated in the appended claims. Analysis of the reaction products was carried out by gas liquid chromatography (g.l.c.).

EXAMPLE 1

10.67 g. of $Si_2Cl_6$ was mixed with 3.37 g. of methylene chloride and 0.29 g. of tri-n-propylamine catalyst was added with stirring. The mixture was allowed to disproportionate for 90 hours at room temperature. The methylene dichloride and silicon tetrachloride were removed at reduced pressure.

The residue was a mixture of the amine and polysilanes having 3 or more silicon atoms per molecule and on the average less than 3 chlorine atoms per silicon atom. To this mixture was added 3 ml. of the dimethyl ether of ethylene glycol and 3 ml. of allyl chloride. The mixture was reacted 42 hours at 85°C. At the end of this time, most of the allyl chloride was consumed and the only observable product by g.l.c. was allyl trichlorosilane.

EXAMPLE 2

In each case shown below the silanes employed were distilled materials. The indicated quantity of disilane was mixed with the indicated hydrocarbon halide and the specified solvent in amount of 1 mol of solvent per In the table, Runs 6, 8, 10, 13 and 15 were made without catalyst for comparison. In the table, the following abbreviations are used: Pr for propyl; Bu for butyl; Ph for phenyl; and Me for methyl.

EXAMPLE 3

The silane used in this example was the residue obtained by reacting hydrogen chloride with silicon and then removing the trichlorosilane and lower boiling materials. The residue was a liquid composed of hexachlorodisilane and higher silanes.

125.5 g. of this residue and 52.3 g. of allyl chloride were mixed with 100 g. of orthodichlorobenzene and 2.3 g. of benzene and 2.37 g. of triethylamine was slowly added with stirring. The mixture was then heated at 60° to 80°C. for 24 hours. At the end of this time the mixture was distilled and there was obtained a 46 percent by weight yield of allyltrichlorosilane based on the weight of the silane residue.

For a comparison, the reaction was run with no catalyst. A mixture of 35.2 g. of residue, 27.0 g. o-dichlorobenzene and 9.9 g. of allyl chloride was heated at 75°C. for 24 hours and only 7 percent by weight yield of the desired allyl trichlorosilane was obtained.

EXAMPLE 4

When the following hydrocarbon halides are reacted with hexachlorodisilane in the presence of 2 percent by weight tetrabutyl phosphonium chloride at 150°C. for 100 hours in the absence of a solvent, the following silanes are obtained.

| Hydrocarbon Halide | Silane |
|---|---|
| isopropyl chloride | isopropyltrichlorosilane |
| octyl chloride | octyltrichlorosilane |
| dodecyl chloride | dodecyltrichlorosilane |
| octadecyl chloride | octadecyltrichlorosilane |
| methallyl chloride | methallyltrichlorosilane |
| β-phenylethyl chloride | β-phenylethyltrichlorosilane |
| β-phenylpropyl chloride | β-phenylpropyltrichlorosilane |
| p-methylbenzyl chloride | p-tolyltrichlorosilane |
| octenyl chloride | octenyltrichlorosilane |

EXAMPLE 5

When allyl chloride is reacted with hexachlorodisilane in the presence of 5 percent by weight of the following catalysts at 150°C. for 100 hours, allyltrichlorosilane is obtained. The catalysts are:
benzyldimethylamine hydrochloride
benzyltriethyl ammonium chloride
octadecyltrimethyl phosphonium chloride
hexyltrimethyl ammonium chloride
t-butyldimethylamine
(omega-phenyl)octyltributyl phosphonium chloride.

That which is claimed is:

1. A method of reacting (1) RCl with (2) $Me_xCl_ySi$ to produce $RMe_xSiCl_{3-x}$, the improvement comprising carrying out the reaction in contact with a catalytic amount of a catalyst of the group consisting of $R'_3N$, $R'_3N.HCl$, $R'_4NCl$ and $R'_4PCl$ at a temperature of from 30° to 250°C. in which R is an alkyl radical of from 1 to 18 carbon atoms, an alkenyl radical of 2 to 18 carbon atoms, or an aralkyl radical of from 7 to 18 carbon atoms, $x$ is 0 to 2, $y$ is 1 to 3, the sum of $x + y$ being from 1.5 to 3, all the silicon atoms in (2) being bonded to at least one other silicon atom and all the valences of the silicon atoms in (2) being satisfied by other silicon atoms, Cl or Me radicals, and R' is an alkyl or aralkyl radical of from 1 to 18 carbon atoms.

2. The process of claim 1 in which the catalyst is the defined quaternary ammonium chlorides.

3. The process of claim 1 in which the catalyst is the defined quaternary phosphonium chlorides.

4. The process of claim 1 in which (1) is allyl chloride.

5. The process of claim 1 in which (1) is allyl chloride and the catalyst is tetrabutyl ammonium chloride.

6. The process of claim 1 in which (1) is allyl chloride and the catalyst is tetrabutyl phosphonium chloride.

* * * * *